E. HEYDON.
TROLLEY WHEEL.
APPLICATION FILED NOV. 28, 1919.
1,358,205.
Patented Nov. 9, 1920.
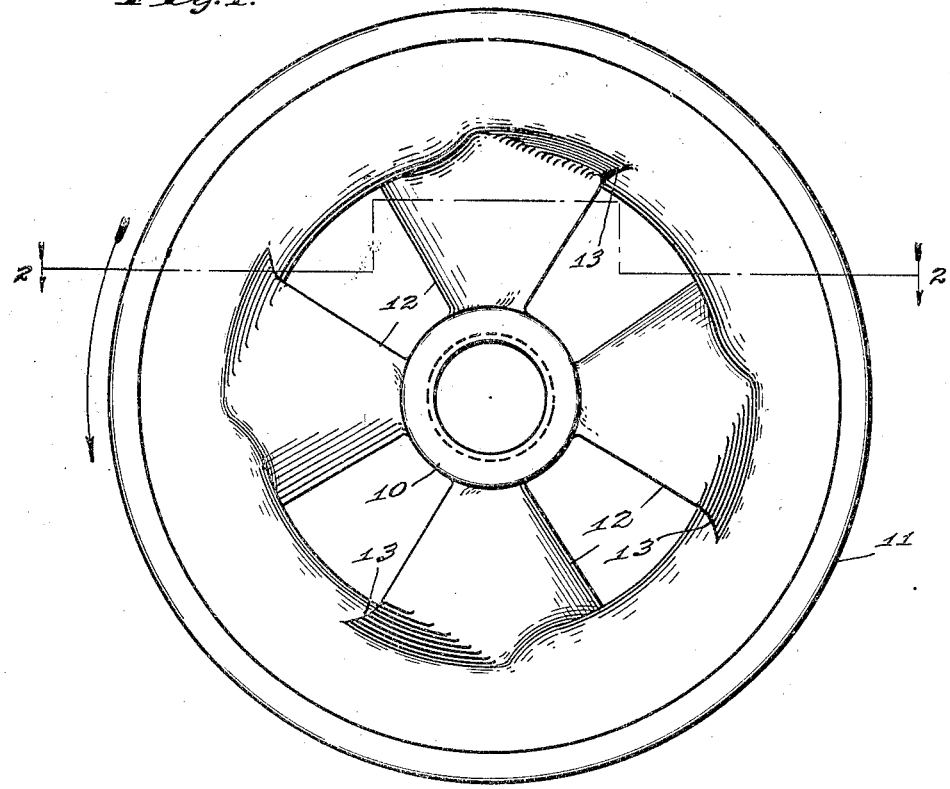
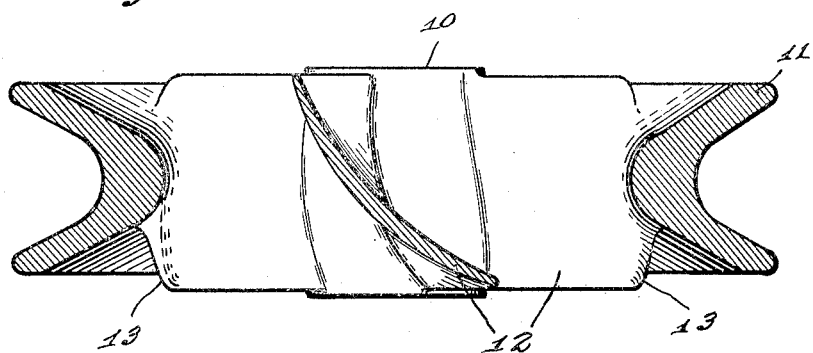
Inventor
Edward Heydon,
By
Hood & Schley.
Attorneys

UNITED STATES PATENT OFFICE.

EDWARD HEYDON, OF INDIANAPOLIS, INDIANA.

TROLLEY-WHEEL.

1,358,205.  Specification of Letters Patent.  Patented Nov. 9, 1920.

Application filed November 28, 1919. Serial No. 341,248.

*To all whom it may concern:*

Be it known that I, EDWARD HEYDON, a citizen of the United States, residing at Indianapolis, in the county of Marion and State of Indiana, have invented a new and useful Trolley-Wheel, of which the following is a specification.

It is the object of my invention to keep trolley wheels cool while in operation, and thereby to increase their life by preventing the brass of which they are made from becoming brittle as it does when hot and by preventing the burning out of the trolley bearings, and also to keep down their electrical resistance.

I attain this object by skewing the spokes of the trolley wheel so that they act as fan blades to draw air through the trolley wheel to cool it.

The accompanying drawing illustrates my invention. Figure 1 is an elevation of a trolley wheel embodying my invention; and Fig. 2 is a section on the line 2—2 of Fig. 1.

The trolley wheel comprises the usual hub 10 and grooved rim 11, by which the trolley wheel is mounted on its bearing pin and by which it engages the trolley wire respectively.

The hub 10 and rim 11 are connected by spaced spokes 12, which are made as plates set at an angle to the wheel axis or skewed, preferably with their forward faces slightly concave, as is clear from Fig. 2. These skewed spokes 12 serve as fan blades to force the air axially through the spaces between the spokes, and this reduces the temperature of the trolley wheel to a point much below what it would otherwise be.

The fan-blade spokes 12 preferably project axially slightly beyond the planes of the side faces of the rim 11, and on their advancing edges the outer ends of said fan-blades are connected to the rim by webs 13 which prevent the air caught by these advancing edges from being thrown outward by centrifugal force.

As the trolley wheel rotates in its travel along the trolley wire, the advancing edges of the fan-blade spokes 12 catch air and force it through the spaces between the spokes. This air effectively cools the whole trolley wheel. This cooling has at least three beneficial effects:

1. It keeps the brass of which the trolley wheel is made from becoming brittle, and thereby prevents the trolley wheel from having pieces broken off in the rough usage to which it is subjected.

2. It keeps the bearing surfaces cooler, and thereby prevents their burning out.

3. It cuts down the electrical resistance of the trolley wheel, and thereby the drop of voltage between the trolley wire and the trolley pole.

The first two of these result in increasing the life of the trolley wheel; for it is found in practice that by this cooling the life may be more than doubled. The third decreases the losses in the electrical circuit.

I claim as my invention:

1. A trolley wheel, comprising a hub, a trolley-wire-engaging rim, and spokes joining said hub and rim, said spokes being in the form of fan blades.

2. A trolley wheel, comprising a hub and a trolley-wire-engaging rim with axially extending spaces between them, and means for forcing air through such spaces as the trolley wheel rotates.

3. A trolley wheel, comprising a hub, a trolley-wire-engaging rim, and spokes formed as skewed plates connecting said hub and rim.

4. A trolley wheel, comprising a hub, a trolley-wire-engaging rim, and spokes formed as skewed plates connecting said hub and rim, said plates projecting axially beyond the edge planes of the rim.

5. A trolley wheel, comprising a hub, a trolley-wire-engaging rim, spokes formed as skewed plates connecting said hub and rim, said plates projecting axially beyond the edge planes of the rim, and webs at the outer ends of the spokes on their intake side from preventing air from being thrown outward by centrifugal force.

In witness whereof, I have hereunto set my hand at Indianapolis, Indiana, this twenty-fifth day of November, A. D. one thousand nine hundred and nineteen.

EDWARD HEYDON.